(12) United States Patent
Hagen et al.

(10) Patent No.: US 12,197,235 B2
(45) Date of Patent: Jan. 14, 2025

(54) METHOD FOR CONTROLLING A FLIGHT MOVEMENT OF AN AERIAL VEHICLE AND AERIAL VEHICLE

(71) Applicant: Spleenlab GmbH, Saalburg-Ebersdorf (DE)

(72) Inventors: Chris Hagen, Bad Lobenstein (DE); Florian Ölsner, Jena (DE); Stefan Milz, Saalburg-Ebersdorf (DE)

(73) Assignee: Spleenlab GmbH, Saalburg-Ebersdorf (DE)

( * ) Notice: Subject to any disclaimer, the term of this patent is extended or adjusted under 35 U.S.C. 154(b) by 242 days.

(21) Appl. No.: 17/837,939

(22) Filed: Jun. 10, 2022

(65) Prior Publication Data

US 2022/0397919 A1 Dec. 15, 2022

(30) Foreign Application Priority Data

Jun. 11, 2021 (DE) .................... 10 2021 115 139.2

(51) Int. Cl.
*G05D 1/00* (2024.01)
*B64U 101/30* (2023.01)

(52) U.S. Cl.
CPC ............ *G05D 1/106* (2019.05); *G05D 1/0094* (2013.01); *B64U 2101/30* (2023.01); *B64U 2201/10* (2023.01)

(58) Field of Classification Search
CPC .... G05D 1/106; G05D 1/0094; B64C 39/024; B64U 2101/30; B64U 2201/10;
(Continued)

(56) References Cited

U.S. PATENT DOCUMENTS

| 2005/0109872 A1 | 5/2005 | Voos et al. |
| 2018/0290748 A1 | 10/2018 | Corban et al. |

(Continued)

FOREIGN PATENT DOCUMENTS

| WO | 9516247 | 6/1995 |
| WO | 2018081952 | 5/2018 |

(Continued)

OTHER PUBLICATIONS

WO_2021083151 machine_translation (Year: 2021).*

*Primary Examiner* — Alan D Hutchinson
(74) *Attorney, Agent, or Firm* — Boyle Fredrickson, S.C.

(57) ABSTRACT

The preferred embodiments pertain to a method for controlling a flight movement of an aerial vehicle that includes acquiring first image data by means of a first camera device that is arranged on an aerial vehicle and configured for monitoring an environment of the aerial vehicle while flying, wherein the first image data are indicative of a first sequence of first camera images. The method also includes acquiring second image data by means of a second camera device that is arranged on an aerial vehicle and configured for monitoring the environment of the aerial vehicle while flying, wherein the second image data are indicative of a second sequence of second camera images. The processing includes determining object parameters for a position of a flight obstacle in the environment of the aerial vehicle if the first image analysis predicts the flight obstacle in the at least one camera measurement image and the second image analysis likewise identifies the flight obstacle in the at least one camera measurement image. An aerial vehicle is furthermore disclosed.

12 Claims, 2 Drawing Sheets

(58) Field of Classification Search
CPC . G06T 2207/10032; G06T 2207/20084; G06T 2207/30261; G06T 7/73; G08G 5/0021; G08G 5/0069; G08G 5/0078; G08G 5/045

See application file for complete search history.

(56) References Cited

U.S. PATENT DOCUMENTS

| | | |
|---|---|---|
| 2018/0322749 A1 | 11/2018 | Kempel et al. |
| 2019/0056726 A1 | 2/2019 | Weldemariam et al. |
| 2019/0068829 A1 | 2/2019 | Van Schoyck et al. |
| 2019/0087635 A1* | 3/2019 | Klaus ................ G06V 20/64 |
| 2020/0301427 A1 | 9/2020 | Restifo et al. |

FOREIGN PATENT DOCUMENTS

| | | | |
|---|---|---|---|
| WO | 2019152312 | 8/2019 | |
| WO | 2020135604 | 7/2020 | |
| WO | WO-2021083151 A1 * | 5/2021 | ........... G06K 9/0063 |

* cited by examiner

METHOD FOR CONTROLLING A FLIGHT MOVEMENT OF AN AERIAL VEHICLE AND AERIAL VEHICLE

BACKGROUND OF THE INVENTION

Field of the Invention

The invention refers to a method for controlling a flight movement of an aerial vehicle and to an aerial vehicle.

Description of Related Art

Aerial vehicles are known in the form of manned and unmanned aerial vehicles. The flight movement of the aerial vehicles is controlled with the aid of a control device that makes available control signals in order to control, for example, drive units and control surfaces. In this context, it is known to take into account sensor signals of a sensor device, which represent environmental parameters for the environment of the aerial vehicle, in the determination of the control signals for the flight movement of the aerial vehicle and to carry out the flight movement in dependence on such sensor signals.

SUMMARY OF THE INVENTION

It is an object of the present invention to provide a method for controlling a flight movement of an aerial vehicle, as well as an aerial vehicle, which allow an efficient and reliable control of the flight movement.

In order to attain this objective, the invention proposes a method for controlling a flight movement of an aerial vehicle and an aerial vehicle according to independent claims 1 and 10. Embodiments of the invention are disclosed in the dependent claims.

According to one aspect, the invention proposes a method for controlling a flight movement of an aerial vehicle that comprises the following: acquiring first image data by means of a first camera device that is arranged on an aerial vehicle and configured for monitoring an environment of the aerial vehicle while flying, wherein the first image data represent(s) a first sequence of first camera images; acquiring second image data by means of a second camera device that is arranged on an aerial vehicle and configured for monitoring the environment of the aerial vehicle while flying, wherein the second (first) image data represent(s) a second sequence of second camera images; and processing the first and the second image data by means of an evaluation device, wherein the following is provided: pre-processing the first and the second image data, wherein in this process measurement image data (photogrammetry data) representing at least one camera measurement image (camera photogram) are (is) determined from the first and the second image data; carrying out a redundant image analysis of the at least one camera measurement image, wherein in doing so the at least one camera measurement image is analyzed in separate image analyses (namely) by means of a first image analysis that is based on artificial intelligence and a second image analysis that is carried out free of (without any) artificial intelligence; determining object parameters for a position of a flight obstacle in the environment of the aerial vehicle if the first image analysis predicts the flight obstacle in the at least one camera measuring image and the second image analysis likewise identifies the flight obstacle in the at least one camera measurement image; and transmitting flight obstacle data representing at least the object parameters to a control device of the aerial vehicle. A flight movement of the aerial vehicle is controlled by the control device with consideration of the object parameters in order to avoid a collision with the flight obstacle.

According to another aspect, an aerial vehicle is provided that comprises the following: a sensor device having a first and a second camera device; an evaluation device having one or more processors; and a control device that is configured for controlling a flight movement of the aerial vehicle. The aerial vehicle is configured for the following: acquiring first image data by means of a first camera device that is arranged on an aerial vehicle and configured for monitoring an environment of the aerial vehicle while flying, wherein the first image data represent(s) a first sequence of first camera images; acquiring second image data by means of a second camera device that is arranged on an aerial vehicle and configured for monitoring the environment of the aerial vehicle while flying, wherein the second (first) image data represent(s) a second sequence of second camera images; and processing the first and the second image data by means of an evaluation device, wherein the following is provided: pre-processing the first and the second image data, wherein in this process measurement image data (photogrammetry data) representing at least one camera measuring image (camera photogram) are (is) determined from the first and the second image data; carrying out a redundant image analysis of the at least one camera measuring image, wherein in doing so the at least one camera measuring image is analyzed in separate image analyses (namely) by means of a first image analysis that is based on artificial intelligence and a second image analysis that is carried out fee of (without any) artificial intelligence; determining object parameters for a position of a flight obstacle in the environment of the aerial vehicle if the first image analysis predicts the flight obstacle in the at least one camera measuring image and the second image analysis likewise identifies the flight obstacle in the at least one camera measuring image; and transmitting flight obstacle data representing at least the object parameters to a control device of the aerial vehicle. The aerial vehicle is configured for controlling a flight movement of the aerial vehicle by means of the control device with consideration of the object parameters in order to avoid a collision with the flight obstacle.

According to the proposed technology, the aerial vehicle is provided with multiple camera devices that respectively acquire image data for the environment of the aerial vehicle during the flight movement, wherein the image data respectively represents a sequence of camera images. In order to evaluate the image data by means of the evaluation device, it is proposed to carry out a redundant image analysis comprising an image analysis that is based on artificial intelligence, as well as an image analysis that is not based on (without any) artificial intelligence, such that it is checked whether the acquired image data represents a flight obstacle for the flight movement of the aerial vehicle in independent image analyses. Object parameters for the position of such a flight obstacle are determined if the image analysis, which is not based on artificial intelligence, verifies a result of the image analysis, which is based on artificial intelligence, to the effect that the analyzed image data indicates at least one flight obstacle. The determination of the object parameters is only carried out if this is the case, wherein the object parameters are transmitted to the control device of the aerial vehicle in the course of the transmission of flight obstacle data such that the control device can subsequently control the flight movement of the aerial vehicle in such a way that a collision with the identified or detected flight obstacle is avoided. The redundant image analysis of the previously acquired image data by means of the two independent image analyses increases the certainty for a correct identification of flight obstacles and the subsequent collision avoidance. An image analysis based on artificial intelligence and a conventional image analysis (that is not based on artificial intelligence) are used independently of one another for the evaluation of the image data acquired with multiple camera devices.

During the determination of the object parameters for the flight obstacle, at least one object parameter of the following group can be determined: distance of the flight obstacle from the aerial vehicle, direction of the flight obstacle in relation the aerial vehicle, size of the flight obstacle, moving flight obstacle, motionless flight obstacle, orientation of a flight movement of the flight obstacle, current speed of the flight movement of the flight obstacle, and a predicted flight path of the flight obstacle for a prediction period.

The determination of the object parameters may furthermore comprise the following: making available flight movement data representing the flight movement of the aerial vehicle by means of the control device; and determining the object parameters for the position of the flight obstacle in the environment of the aerial vehicle with consideration of the flight movement data. The flight movement data particularly may characterize a current flight movement of the aerial vehicle, e.g., with respect to speed and/or direction in space. The consideration of the flight movement data optimizes the determination of the object parameters for the flight obstacle for collision avoidance purposes in that they are respectively determined in dependence on or with consideration of the flight movement data.

A movement of the flight obstacle can be determined during the second image analysis by means of an optical flow. An optical flow indicates, for example, a movement path of one or more image pixels in the at least one camera measurement image and therefore can represent a movement of image pixels that may be assigned to a flight obstacle, which in turn indicates a moving flight obstacle. An optical flow of an image sequence generally refers to a vector field of a speed of one or more image pixels into the monitored space (environment) projected into the image plane. The optical flow therefore is a representation of movement information in the course of the image analysis.

One or more of the following flight obstacle parameters can be determined during the first image analysis by means of an analysis algorithm that is based on artificial intelligence: height of the flight obstacle, width of the flight obstacle, and confidence value for the identification of the flying object in the at least one camera measurement image. In the course of the image analysis based on artificial intelligence, it may be provided that a frame or a box is determined around the flight obstacle in the at least one camera measurement image by means of the analysis algorithm used in order to thereby define an image area of the at least one camera measurement image, in which the flight obstacle is located with certain probability. The frame can be defined in such a way that it indicates external boundaries of the flight obstacle in the at least one camera measurement image, which in turn makes it possible to determine the height and/or width of the flight obstacle.

A neural network can be used in the image analysis by means of the analysis algorithm based on artificial intelligence, e.g., in combination with a determination of an optical flow by means of the analysis algorithm that is not based on artificial intelligence. The previously trained neural network directly processes the image data during the image analysis based on artificial intelligence. Different layers of the neural network can be gone through until parameters ultimately are directly estimated in image coordinates (pixel coordinates, frame size, object class, as well as confidence value). The object parameters such as the distance of the flight obstacle from the aerial vehicle, the direction of the flight obstacle in relation to the aerial vehicle, and the size of the aerial vehicle can be determined from the parameters of the neural network as well as the determined object class by means of the camera parameters (calibration).

For example, edge filters such as Sobel filters up to optical flow processes, which are based on simple geometric methods, may be used as methods that are not based on artificial intelligence.

During the determination of the object parameters, a three-dimensional movement path of the flight obstacle in the environment, e.g., the flight of another aerial vehicle, can be determined from temporally successive positions of the flight obstacle.

The following (measures) may furthermore be provided: carrying out a visual analysis of the first/second camera device during pre-processing of the first and the second image data, wherein it is in the process determined whether a respective detection field of view (acquisition lens coverage/camera lens coverage) of the first/second camera device is free of a field of view blockage (lens coverage blockage). In this way, it is ensured that the acquisition or detection field of view (lens coverage) of the camera devices is respectively not blocked such that the image data can be acquired with sufficient certainty in order to subsequently carry out an image analysis that meets the safety requirements.

The extent, to which the detection field of view (acquisition lens coverage) of the first camera device and/or the second camera device is blocked, can be determined during the visual analysis and view characteristic data (lens coverage parameters) indicating the extent of the blockage of the detection field of view can be made available in the evaluation device and transmitted to the control device. In this way, the control device receives information on whether and, if applicable, to which extend the detection field of view of one or more camera devices is blocked, e.g., due to dirt accumulation. Corresponding safety measures can then be taken. For example, the image data of a camera device, the detection field of view of which is partially blocked, may be excluded from the image data analysis.

If the field of view characteristic data (lens coverage parameters) indicate that the extent of the blockage of the detection field of view (acquisition lens coverage) of the first camera device and/or the second camera device exceeds a threshold value, the control device can check the field of view characteristic data and control the flight movement of the aerial vehicle in accordance with emergency landing control signals, wherein the emergency landing control signals are configured for effecting an emergency landing of the aerial vehicle. Exceeding this threshold value indicates a situation, in which a reliable control of the flight movement based on the acquired image data is potentially no longer possible, such that the emergency landing is initiated.

The embodiments described above in connection with the method for controlling the flight movement of the aerial vehicle may be realized accordingly in connection with the aerial vehicle. The aerial vehicle may be a manned or unmanned aerial vehicle.

The camera device and the evaluation device may be jointly accommodated in a sensor module or sensor device, which is mounted on the aerial vehicle in the form of a detachable unit.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Additional exemplary embodiments are described in greater detail below with reference to Figures of a drawing. In the drawing.

DETAILED DESCRIPTION OF THE PREFERRED EMBODIMENTS

Figure 1:
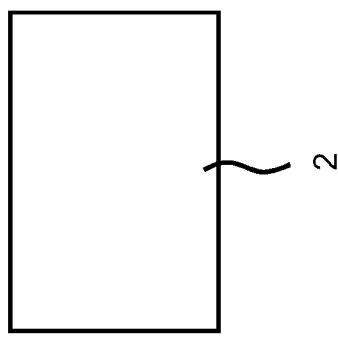
FIG. 1 shows a schematic representation of an arrangement with a sensor device and an evaluation device.
Figure 1:
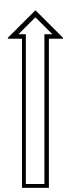
Figure 1:
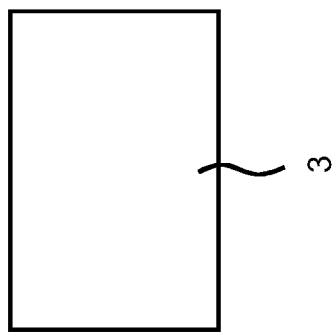

FIG. 1 shows a schematic representation of an arrangement of functional components used for controlling a flight movement of an aerial vehicle with a sensor device 1 and an evaluation device 2, which is configured for evaluating image data acquired by means of the sensor device 1, in order to determine object parameters for a stationary (motionless) or a moving flight obstacle, e.g., a flying flight obstacle, such that a control device 3 of the aerial vehicle can control the flight movement of the aerial vehicle based on these object parameters in such a way that a collision with the flight obstacle is avoided, e.g., a collision with other aerial vehicles in the airspace, but also a collision with stationary flight obstacles arranged on the ground such as chimneys or towers.

Figure 2:
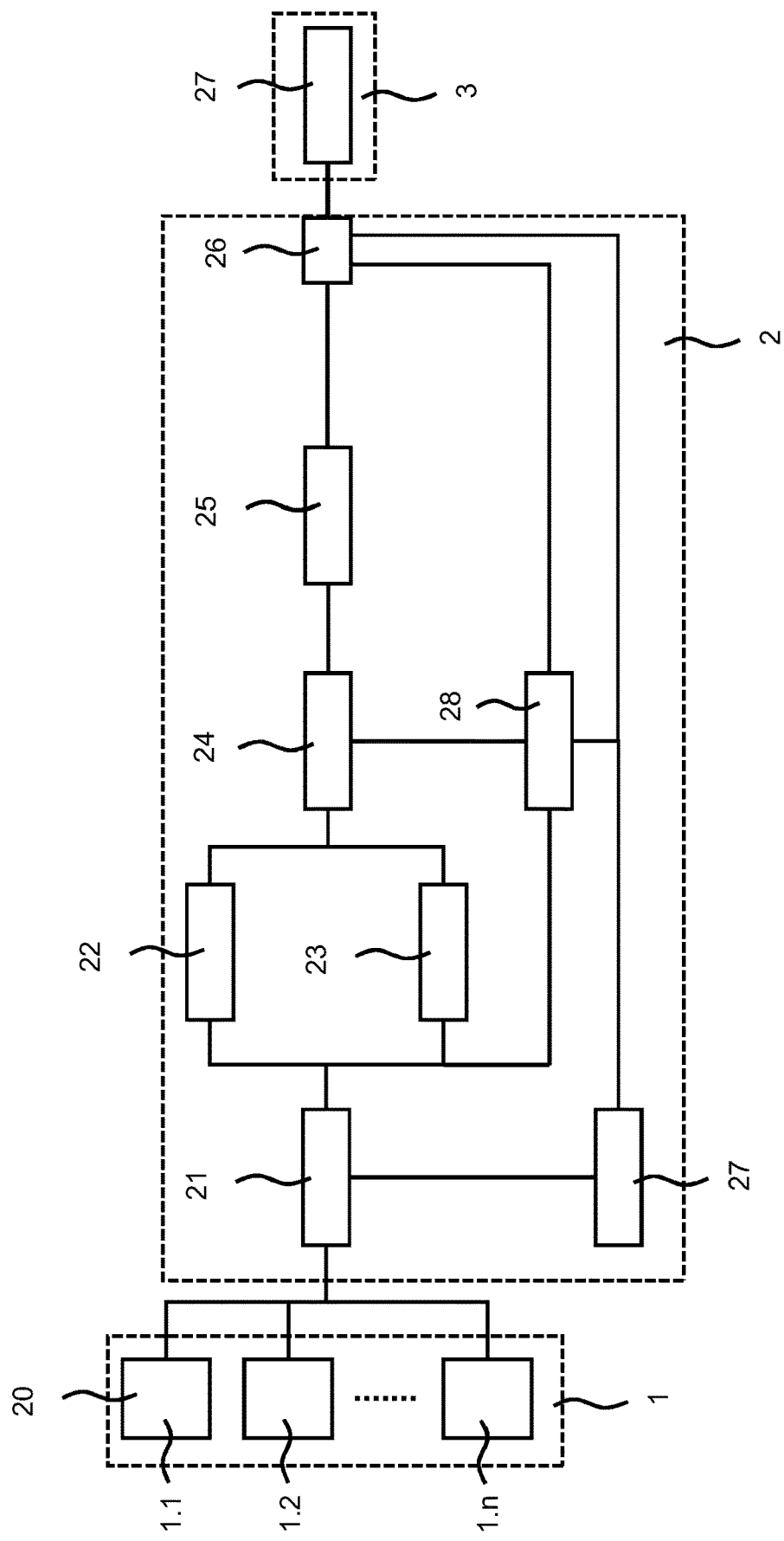
FIG. 2 shows a schematic representation of a method for controlling a flight movement of an aerial vehicle.

According to FIG. 2, the sensor device 1 comprises multiple camera devices 1.1, . . . , 1.n, which are respectively configured for monitoring an environment of the aerial vehicle during its flight movement and in the process acquiring respective image data that represents a sequence of camera images. For example, the camera devices 1.1, . . . , 1.n may comprise one or more of the following camera types: thermal imaging camera, photo camera, infrared camera, multispectral camera, and event-based camera (event camera).

The event camera utilizes neuromorphic visual sensors. Instead of delivering an image sequence with a constant frequency (photo camera), event cameras (only) transmit information of the pixels (image data), in which the brightness has significantly changed. Such pixel-by-pixel changes are also referred to as events, which are provided with a timestamp with the accuracy of microseconds and asynchronously transmitted immediately thereafter. Since only non-redundant information is transmitted, event cameras are energy-efficient and capable of detecting very fast movements. Consequently, they directly address the conflict of objectives between energy demand and latency. In addition, event cameras that have a dynamic range, for example, of approximately 140 dB (in comparison with standard cameras with a typical dynamic range around 60 dB) can be used because each pixel is independent.

The image data acquired in step 20 is transmitted from the sensor device 1 to the evaluation device 2, in which the camera images are processed. It is proposed to initially pre-process the image data (step 21). In this case, measurement image data (photogrammetry data) representing at least one camera measurement image (camera photogram) is determined from the image data. This means that a fusion of the different image data (camera images) is carried out. Raw data is combined into at least one camera measurement image. It would also be possible to generate multiple camera measurement images from the image data.

In steps 22 and 23, a redundant image analysis of the measurement image data representing the at least one camera image is carried out in the evaluation device 2 by means of further data processing. The at least one camera measurement image is analyzed by means of an analysis algorithm that is based on artificial intelligence in a first image analysis (step 22).

In an exemplary embodiment, the image analysis is carried out by means of a neural network such as a CNN ("Convolutional Neural Network") or a Visual Transformer. To this end, the pixel data is directly processed by the neural network in the form of RGB values and altered by means of different layers. The neural network directly outputs the parameters in image coordinates. The neural network was previously trained by means of training data.

The at least one camera measurement image (camera photogram) is analyzed in a second image analysis (step 23) independently of the image analysis that is based on artificial intelligence, wherein the second image analysis is carried out by means of a conventional analysis algorithm free of (without any) artificial intelligence.

Both image analyses of the at least one camera measurement image (camera photogram), which are carried out independently of one another, serve for checking whether the at least one camera measurement image (camera photogram) indicates a flight obstacle for the aerial vehicle such that there is a potential risk of collision.

The results of the two image analyses are consolidated in step 24. A subsequent determination of object parameters for the flight obstacle (step 25) only takes place if the consolidation of the results of the image analyses shows that a flight obstacle predicted by the second image analysis (that is based on artificial intelligence) is also identified by the first image analysis (that is not based on artificial intelligence). This means that object parameters for the flight obstacle, which represent a position of the flight obstacle in the environment of the aerial vehicle, are only determined after the second image analysis verifies the result of the first image analysis to the effect that the existence of a flight obstacle in the at least one camera measurement image (camera photogram) is detected. The object parameters for the flight obstacle may comprise one or more of the following parameters: distance of the flight obstacle from the aerial vehicle, direction of the flight obstacle in relation to the aerial vehicle, moving/motionless flight obstacle, and orientation of a flight movement of the flight obstacle. It would alternatively or additionally also be possible to determine a three-dimensional movement path of the flight obstacle in the environment of the aerial vehicle if the redundant image analysis shows the existence of the flight obstacle in the acquired image data.

In step 26, the object parameters for the flight obstacle are made available for transmission to the control device 3 of the aerial vehicle at an interface and transmitted, whereupon the aerial vehicle is controlled by the control device 3 in a collision-avoiding manner (step 27).

In the exemplary embodiment shown, it is optionally proposed to carry out a visual analysis of one or more of the camera devices 1.1, ..., 1.n in step 27 prior to the determination of the object parameters and/or prior to the transmission of the object parameters to the control device 3 in order to further increase the certainty of the identification of the flight obstacle. The visual analysis serves for checking whether a respectively assigned detection field of view (acquisition lens coverage) of one or more of the camera devices 1.1, ..., 1.n possibly is at least partially blocked. If the detection field of view (acquisition lens coverage) is blocked, the associated camera device potentially is no longer able to reliably fulfill its sensor function. In this context, it would be possible to generate field of view characteristic data (lens coverage parameters) and to transmit the field of view characteristic data to the control device 3, wherein the field of view characteristic data indicate whether and, if applicable, to which extend the detection field of view of one or more camera devices 1.1, ..., 1.n is blocked. The control device 3 can initiate an emergency landing of the aerial vehicle when the extent of a blockage of at least one detection field of view (acquisition lens coverage) exceeds a threshold value.

It would be possible to carry out one or more checks of the sensor device 1 and/or the evaluation device 2 (step 28) additionally or alternatively to the visual analysis. This is achieved, for example, by continuously monitoring a system status such as a power supply and/or a capacity utilization of a processor unit, the current runtime of the artificial intelligence and/or a time synchronization of the camera devices 1.1, ..., 1.n either individually or in groups, e.g., in regular time intervals.

The control device 3 then controls the aerial vehicle based on the object parameters received from the evaluation device 2 in such a way that a collision with the detected flight obstacle is avoided.

The characteristics disclosed in the preceding description, the claims and the drawings may be important for the realization of the different embodiments individually, as well as in any combination.

What is claimed is:

1. A method for controlling a flight movement of an aerial vehicle, comprising the steps of
    acquiring first image data by means of a first camera device that is arranged the aerial vehicle and configured to monitor an environment of the aerial vehicle while flying, wherein the first image data are indicative of a first sequence of first camera images;
    acquiring second image data by means of a second camera device that is arranged on the aerial vehicle and configured to monitor the environment of the aerial vehicle while flying, wherein the second image data are indicative of a second sequence of second camera images;
    processing the first and the second image data by means of an evaluation device, comprising:
        pre-processing the first and the second image data, wherein in this process measurement image data indicative of at least one camera measurement image are determined from the first and the second image data;
        performing a redundant image analysis of the at least one camera measurement image, wherein in doing so the at least one camera measurement image is analyzed in separate image analyses by means of a first image analysis that is based on artificial intelligence and a second image analysis that is carried out free of artificial intelligence;
        determining object parameters for a position of a flight obstacle in the environment of the aerial vehicle if the first image analysis predicts the flight obstacle in the at least one camera measurement image and the second image analysis likewise identifies the flight obstacle in the at least one camera measurement image; and
    transmitting flight obstacle data indicative of at least the object parameters to a control device of the aerial vehicle; and
    controlling a flight movement of the aerial vehicle by means of the control device with consideration of the object parameters in order to avoid a collision with the flight obstacle.

2. The method according to claim 1, wherein at least one object parameter of the following group is determined during the determination of the object parameters for the flight obstacle: distance of the flight obstacle from the aerial vehicle, direction of the flight obstacle in relation to the aerial vehicle, size of the flight obstacle, moving flight obstacle, motionless flight obstacle, orientation of a flight movement of the flight obstacle, current speed of the flight movement of the flight obstacle, and a predicted flight path of the flight obstacle for a prediction period.

3. The method according to claim 2, wherein the determination of the object parameters furthermore comprises the following:
    providing flight movement data indicative of the flight movement of the aerial vehicle by means of the control device; and
    determining the object parameters for the position of the flight obstacle in the environment of the aerial vehicle with consideration of the flight movement data.

4. The method according to claim 1, wherein the determination of the object parameters furthermore comprises the following:
    providing flight movement data indicative of the flight movement of the aerial vehicle by means of the control device; and
    determining the object parameters for the position of the flight obstacle in the environment of the aerial vehicle with consideration of the flight movement data.

5. The method according to claim 1, wherein a movement of the flight obstacle is determined during the second image analysis by means of an optical flow.

6. The method according to claim 1, wherein one or more of the following flight obstacle parameters are determined during the first image analysis by means of an analysis algorithm that is based on artificial intelligence: height of the flight obstacle, width of the flight obstacle, and confidence value for the identification of the flying object in the at least one camera measurement image.

7. The method according to claim 1, wherein a three-dimensional movement path of the flight obstacle in the environment is determined from temporally successive positions of the flight obstacle during the determination of the object parameters.

8. The method according to claim 1, wherein the following is furthermore provided: performing a visual analysis of the first/second camera device during pre-processing of the first and the second image data, wherein it is in the process determined whether a respective detection field of view of the first/second camera device is free of a field of view blockage.

9. The method according to claim 8, wherein, during the visual analysis, the extent, to which the detection field of view of the first camera device and/or the second camera device is blocked, is determined and field of view characteristic data indicating the extent of the blockage of the detection field of view is provided in the evaluation device and transmitted to the control device.

10. The method according to claim 9, wherein the control device checks the field of view characteristic data and controls the flight movement of the aerial vehicle in accordance with emergency landing control signals if the field of view characteristic data indicate an extent of the blockage of the detection field of view of the first camera device and/or the second camera device that exceeds a threshold value, wherein the emergency landing control signals are configured for effecting an emergency landing of the aerial vehicle.

11. An aerial vehicle, comprising
a sensor device having a first and a second camera device;
an evaluation device having one or more processors; and
a control device that is configured to control a flight movement of the aerial vehicle;
wherein the aerial vehicle is configured for the following:
acquiring first image data by means of the first camera device that is configured to monitor an environment of the aerial vehicle while flying, wherein the first image data are indicative of a first sequence of first camera images;
acquiring second image data by means of the second camera device that is configured to monitor the environment of the aerial vehicle while flying, wherein the second image data are indicative of a second sequence of second camera images;
processing the first and the second image data by means of the evaluation device, comprising:
pre-processing the first and the second image data, wherein in this process measurement image data indicative of at least one camera measurement image are determined from the first and the second image data;
performing a redundant image analysis of the at least one camera measurement image, wherein in doing so the at least one camera measurement image is analyzed in separate image analyses by means of a first image analysis that is based on artificial intelligence and a second image analysis that is carried out free of artificial intelligence;
determining object parameters for a position of a flight obstacle in the environment of the aerial vehicle if the first image analysis predicts the flight obstacle in the at least one camera measurement image and the second image analysis likewise identifies the flight obstacle in the at least one camera measurement image; and
transmitting flight obstacle data indicative of at least the object parameters to a control device of the aerial vehicle; and
controlling a flight movement of the aerial vehicle by means of the control device with consideration of the object parameters in order to avoid a collision with the flight obstacle.

12. The aerial vehicle according to claim 11, which is designed in the form of an unmanned aerial vehicle.

* * * * *